(12) United States Patent
Carberry

(10) Patent No.: US 7,406,246 B2
(45) Date of Patent: Jul. 29, 2008

(54) OPTICAL SWITCH ALIGNMENT MECHANISM

(75) Inventor: John Carberry, Talbott, TN (US)

(73) Assignee: Neptec Optical Solutions, Inc., Fremont, CA (US)

( * ) Notice: Subject to any disclaimer, the term of this patent is extended or adjusted under 35 U.S.C. 154(b) by 10 days.

(21) Appl. No.: 11/120,332

(22) Filed: May 3, 2005

(65) Prior Publication Data

US 2006/0251358 A1    Nov. 9, 2006

(51) Int. Cl.
*G02B 6/35*    (2006.01)
*G02B 5/08*    (2006.01)

(52) U.S. Cl. .......................... 385/147; 385/16; 385/18; 359/877

(58) Field of Classification Search ........................ None
See application file for complete search history.

(56) References Cited

U.S. PATENT DOCUMENTS

| | | |
|---|---|---|
| 4,057,719 A | 11/1977 | Lewis |
| 5,133,030 A | 7/1992 | Lee |
| 6,606,429 B1 * | 8/2003 | Carberry et al. ................ 385/23 |
| 6,796,718 B2 * | 9/2004 | Jones et al. .................... 385/57 |
| 6,869,229 B2 * | 3/2005 | Reedy et al. ................... 385/88 |
| 6,898,344 B2 * | 5/2005 | Smith et al. .................... 385/23 |
| 6,904,193 B2 * | 6/2005 | Guynn et al. .................. 385/18 |
| 2003/0128915 A1 | 7/2003 | Smith et al. |
| 2003/0206682 A1 | 11/2003 | Guynn et al. |

* cited by examiner

*Primary Examiner*—Sung Pak
*Assistant Examiner*—Omar Rojas
(74) *Attorney, Agent, or Firm*—Pitts & Brittiam, PC

(57) ABSTRACT

An apparatus for aligning an optical element of an optical actuator. The optical actuator moves a guide between a retracted and an extended position relative to an actuator body. The actuator body has a channel, or through-opening, in which the mirror guide moves. In one embodiment, the channel has a two flat surfaces that form a portion of a v-groove in the channel. In the extended position, the guide contacts a stop pin, or stopper, and the two flat surfaces in the through-opening, thereby holding the guide in a position defined by the line of contact between the stop pin and an angled surface of the guide and a pair of parallel contact lines where the guide contacts the two flat surfaces in the through-opening.

15 Claims, 8 Drawing Sheets

OPTICAL SWITCH ALIGNMENT MECHANISM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to optical switch actuators. More particularly, this invention pertains to an actuator body and a mirror guide that interact to ensure a repeatable alignment over a wide temperature range and over time.

2. Description of the Related Art

In fiber optic networks, light signals are transmitted along optical fibers to transfer information from one location to another. Optical switches are used to selectively couple light from an input fiber to an output fiber. Optical fibers typically have very small cross-sections and narrow acceptance angles within which light entering the fiber must fall to promote efficient propagation of the light along the fiber. As such, optical switches must transfer light with precise alignment.

One type of electromechanical optical switch operates by moving a mirror while maintaining the optic fibers and optical pathway stationary. In response to electrical signals, a relay arm moves a mirror into and out of an optical pathway. The relay arm moves the mirror substantially parallel to its reflective surfaces. The travel of the relay arm along that axis is limited by stops that determine the position of the mirror. The relay arm is constrained at the stops by only a single contact point, thereby allowing inaccuracies in the radial position due to rotation of the arm. Examples of such switches include U.S. Pat. No. 5,133,030, issued to Lee on Jul. 21, 1992, entitled "Fiber Optic Switch Having a Curved Reflector," and U.S. Pat. No. 4,057,719, issued to Lewis on Nov. 8, 1977, entitled "Fiber Optics Electro-Mechanical Light Switch."

One problem with such a switch is that the relay mechanism may not be able to provide the accuracy and precision in positioning the mirror that may be required by some optical switching networks. Accuracy is the ability to achieve a desired position with any given movement. Precision is the ability to repeatedly achieve the same position over a number of movements, regardless of where that position is located. Because the movement of the relay arm is constrained by only a single point of contact with the stopper, the switch may only be able to provide accurate alignment along a single axis (in the direction of the arm's movement). The use of a single contact point may result in position inaccuracies due to the freedom of the relay arm to rotate about additional axes. Furthermore, relay mechanisms are typically constructed of materials that may be susceptible to significant wear from component contact through repeated use. Such material wear may lead to problems with precise placement of the optical element over time, in addition to position inaccuracies.

Another problem with electromechanical switches is that they use a large electromechanical actuator that may not permit the placement of mirrors in the packing density that may be required for multiple switch arrays.

Other types of systems use electromagnetic actuators, for example, disk drive systems. These systems typically use actuators to position drive components over different regions of a disk. One problem with such electromagnetic actuators is that they require a control servo loop in order to operate. With a servo loop, the position component must be actively adjusted to maintain proper positioning. As such, actuators of this type are unable to repeatedly return components to the same position when actuated, without the use of an active control loop. This adds complexity to a system's design and, thereby, may undesirably increase its cost.

One example of an optical switch actuator is disclosed in U.S. Pat. No. 6,606,429, titled "Electromechanically controlled optical element," issued to Carberry, et al., on Aug. 12, 2003. Another example of an optical switch actuator is disclosed in United States Published Application 2003/0206682, titled "Optical switch actuator." Still another example of an optical switch actuator is disclosed in United States Published Application 2003/0128915, titled "Fiber optic switch actuator."

BRIEF SUMMARY OF THE INVENTION

According to one embodiment of the present invention, a self-aligning optical switch actuator is provided. The actuator includes an actuator body, a mirror guide, and a stop cylinder. The actuator body includes a channel in which the mirror guide moves between an extended position and a retracted position. In one embodiment, the channel includes two flat surfaces upon which the mirror guide rests when the mirror guide is in the extended position. In this embodiment, the guide contacts the two flat surfaces at two contact lines that are parallel.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for aligning a mirror guide 112 in an optical switch actuator body 102 is disclosed. The mirror guide 112 and the actuator body 102 are components of an optical switch actuator 100 that moves an optical element 508 between an extended position and a retracted position. Typically, the extended position allows the optical element 508 to interact with an optical path, for example, as in an optical switch where the optical element redirects an optical signal by reflecting the signal. An optical switch constructed with this invention has a repeatability insertion loss of less than or equal to 0.05 dB. That is, the insertion loss of the switch varies less than or equal to 0.05 dB for repeated operations of the switch.

Figure 1:
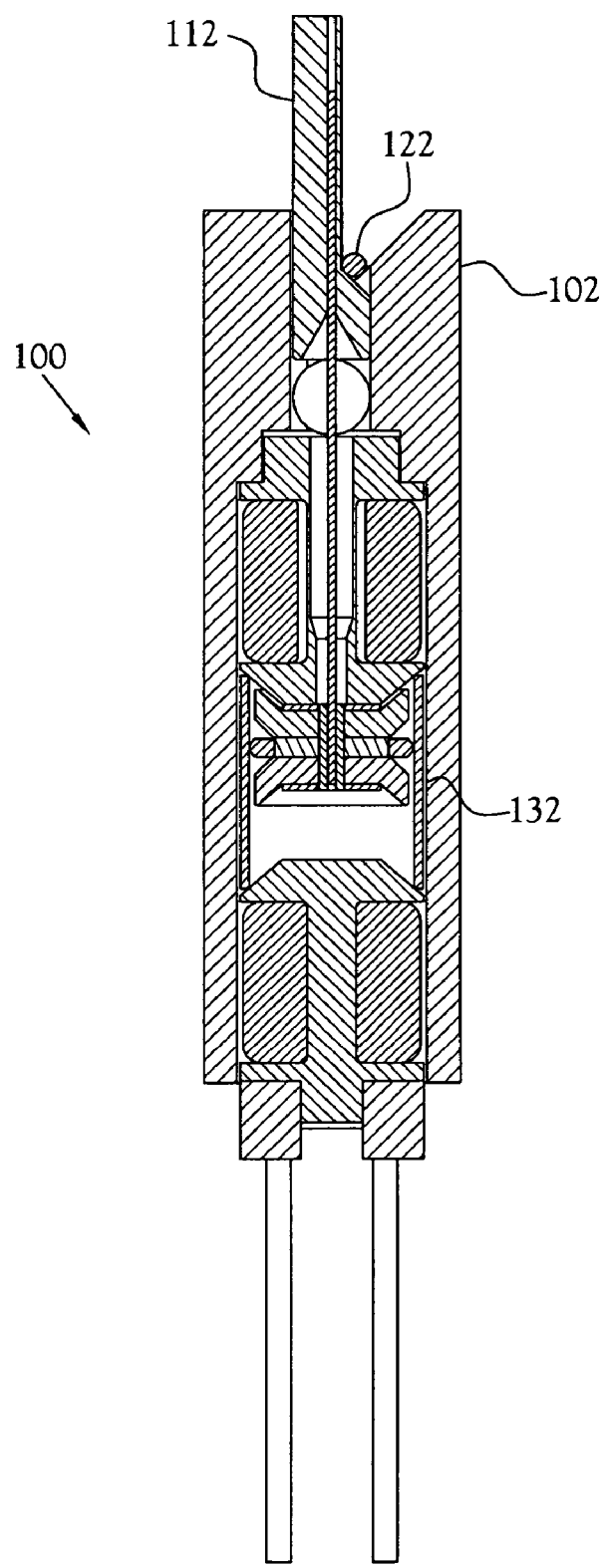
FIG. 1 is a cross-sectional view of one embodiment of a switch actuator.

FIG. 1 illustrates a cross-sectional view of one embodiment of a switch actuator 100. The switch actuator 100 includes an outer actuator body 102 that contains the actuator driving mechanism 132. The switch actuator 100 also includes a mirror guide 112 that, when the mirror guide 112 is in the extended position, contacts a stop pin, or cylinder, 122. The stop pin, or stopper, 122 is restrained from moving along the longitudinal axis of the switch actuator 100, in one embodiment, by a cap 404 (See FIG. 4) or, in another embodiment, by fixing the stopper 122 to the body 102 with an adhesive. In operation, the driving mechanism 132 causes the mirror guide 112 to move along the longitudinal axis 612 of the switch actuator 100. Those skilled in the art will recognize that the driving mechanism 132 can be any linear motive device without departing from the spirit and scope of the present invention. Those skilled in the art will recognize that the mirror guide 112 can carry any type of optical element and is not limited to carrying a reflective optical element 508. Because the illustrated embodiment shows a reflective optical element 508 carried by the guide 112, the guide 112 is generally referred to as a mirror guide 112 herein; however, the guide 112 is not limited to only carrying a reflective optical element 508.

Figure 2:
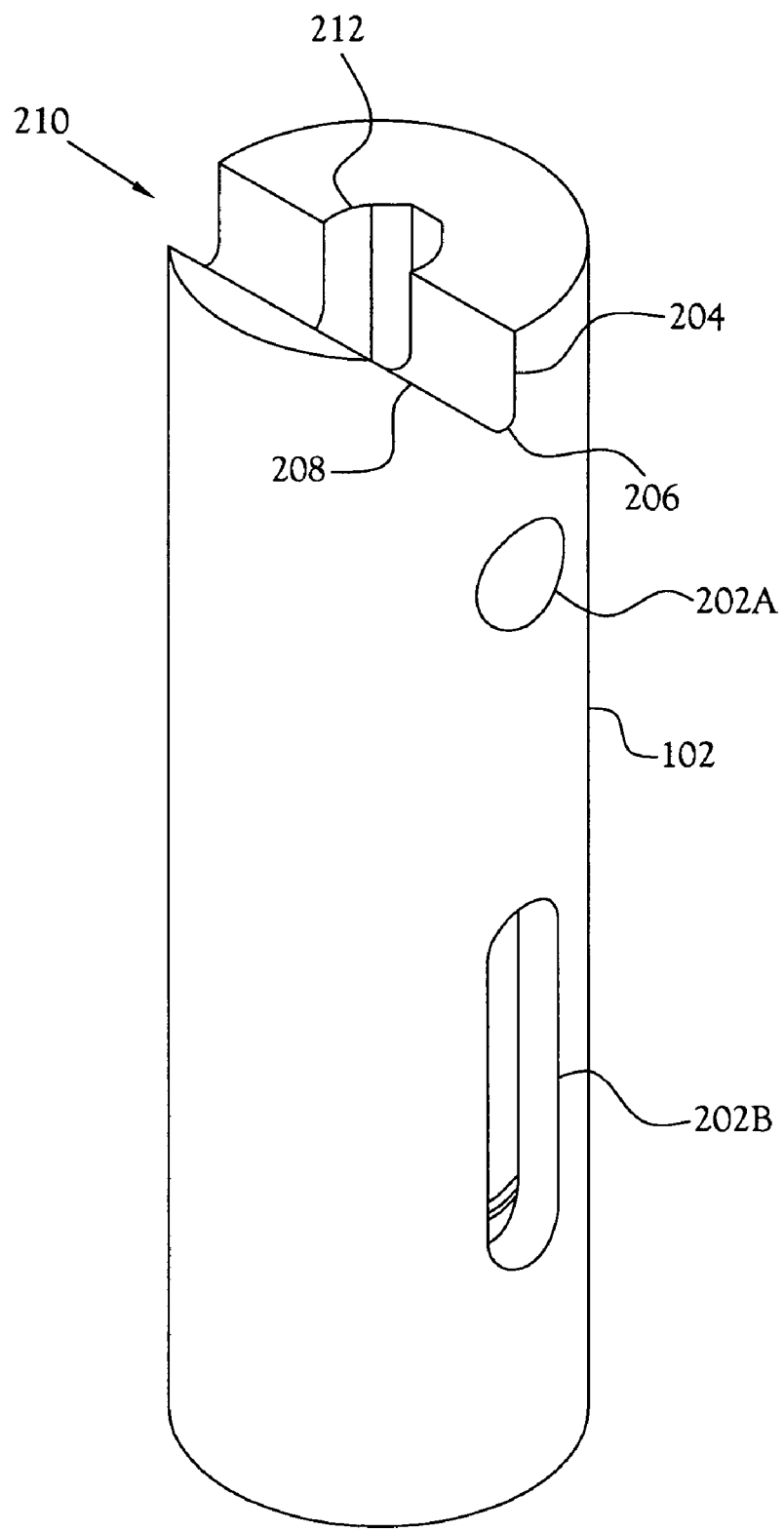
FIG. 2 is a perspective view of one embodiment of an actuator body.

FIG. 2 illustrates a perspective view of one embodiment of an actuator body, or member, 102. The actuator body 102 is cylindrical with a central, longitudinally oriented channel 212 in which the mirror guide 112 travels. The illustrated embodiment of the actuator body includes two openings 202A, 202B for inspection and securing the internal driving mechanism 132 to the actuator body 102. Those skilled in the art will recognize that although, in the illustrated embodiment the actuator body 102 encloses the driving mechanism 132, the actuator body 102 is a member that performs the functions as described herein for aligning the guide 112 and the member 102 is not limited to enclosing or containing the driving mechanism 132.

One end of the actuator body 102 includes a notch 210 with a longitudinal face 204, a corner 206, and an angled face 208. The notch 210 receives the stop pin 122, which rests between the longitudinal face 204 and the angled face 208 of the notch 210. In one embodiment, the stop pin 122 is secured in the notch 210 with an adhesive. In another embodiment, illustrated in FIG. 4, a cap 404 secures the stop pin 122 in the notch 210.

Figure 3:
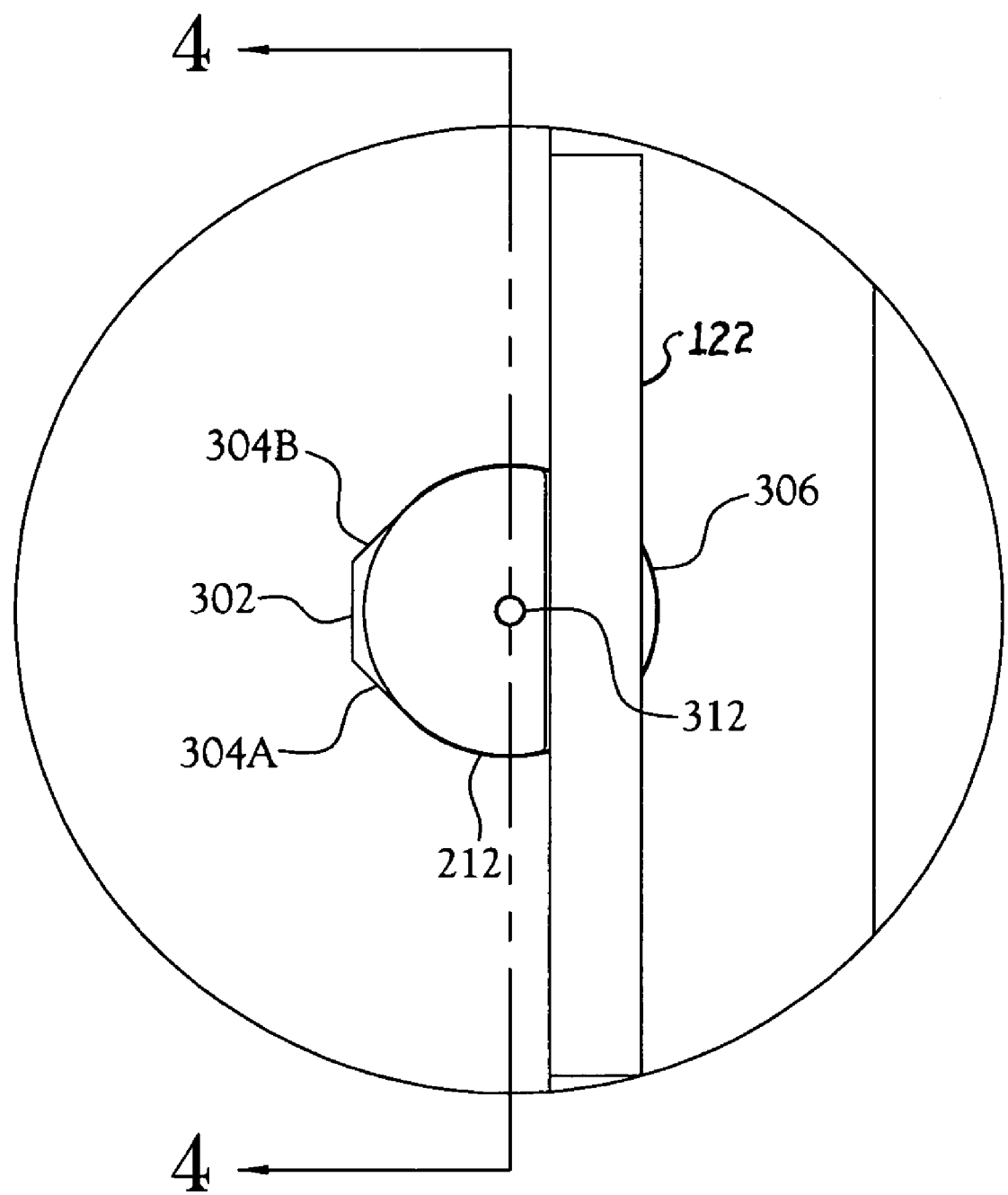
FIG. 3 is a top view of the actuator body.

FIG. 3 illustrates a top view of the actuator body 102 of FIG. 2. The central, longitudinally oriented opening or channel, 212 in the actuator body 102 allows the mirror guide 112 to move freely in the longitudinal direction between the extended and retracted positions. The mirror guide 112 has a circular profile that fits into the channel 212 with sliding clearance. Visible in the center of the top of the mirror guide 112 is a hole 312 that receives a guide wire that connects the mirror guide 112 to the driving mechanism 132.

The channel 212 is a through-opening in the body 102 and has a modified v-shape with two straight sidewalls 304A, 304B. At the apex of the v-shape formed by the two sidewalls 304A, 304B is a flat apex sidewall 302. Opposite the apex sidewall 302 of the v-shape is a circular sidewall 306. The shape of the channel 212 is such that the mirror guide 112 makes contact with the two sidewalls 304A, 304B when the mirror guide 112 is pushed toward the flat apex 302.

Figure 4:
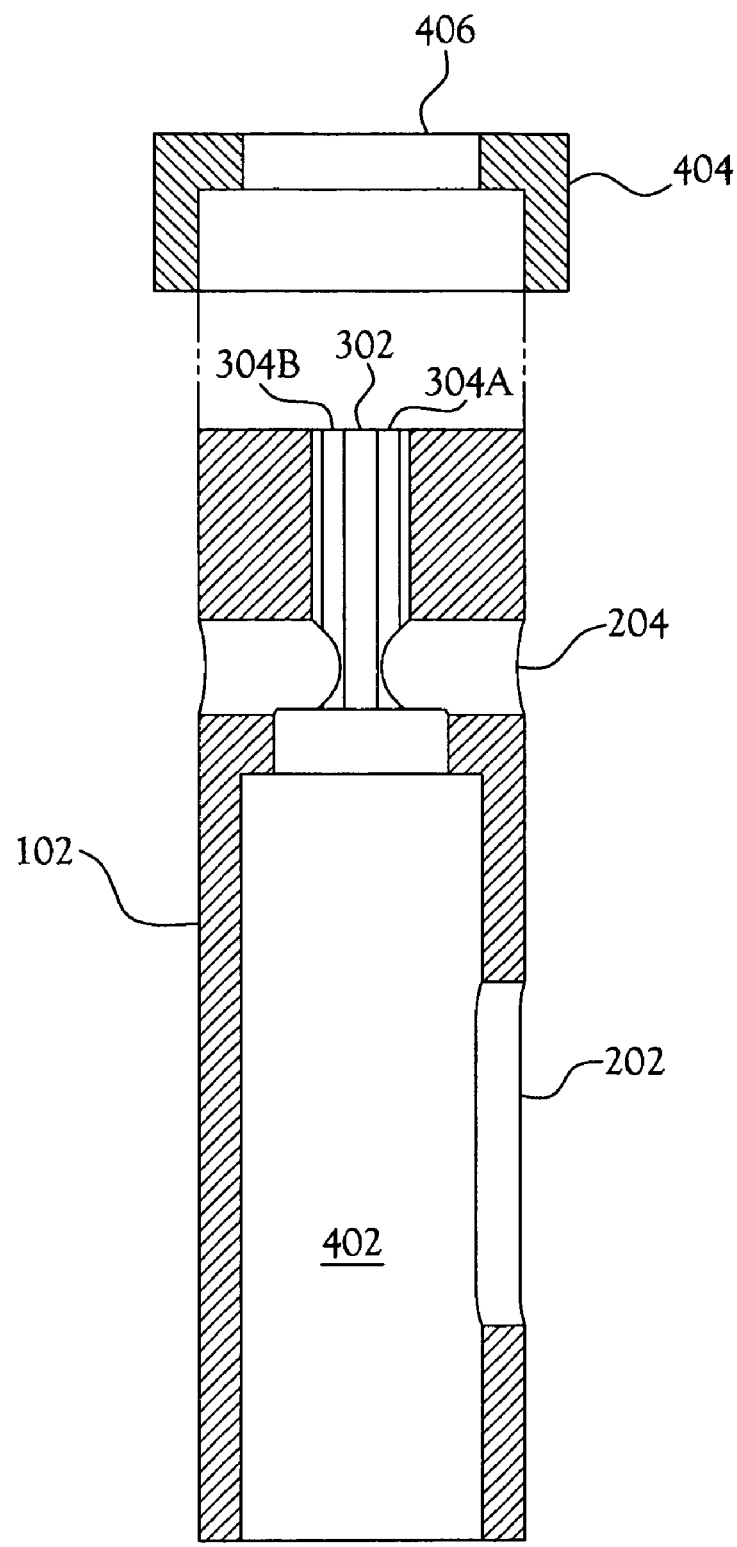
FIG. 4 is a cross-sectional view of the actuator body.

FIG. 4 illustrates a cross-sectional view of the actuator body 102. The driving mechanism 132 is contained within the hollow portion 402 of the actuator body 102 and connects with the mirror guide 112 that moves within the channel 212. Visible in FIG. 4 are the v-sidewalls 304A, 304B and the flat apex 302. In the illustrated embodiment, a cap 404 fits over the actuator body 102 and holds captive the stopper 122 in the notch 210. The cap 404 has a central opening 406 through which the guide 112 passes. The cap 404 is fixed to the body 102 with an adhesive. In another embodiment, the cap 404 is not used, and the stopper 122 is secured in the notch 210 with an adhesive.

Figure 5:
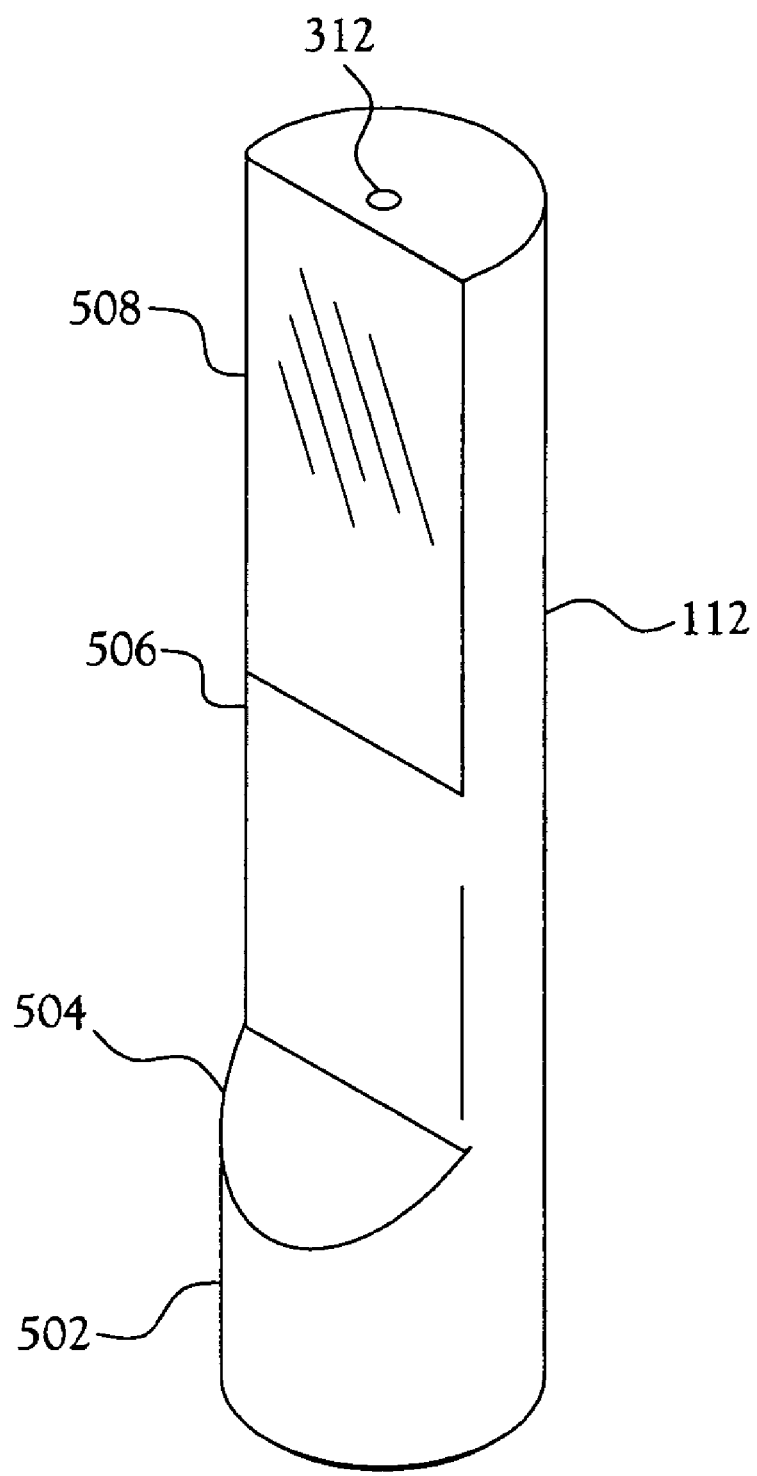
FIG. 5 is a perspective view of one embodiment of a mirror guide.

FIG. 5 illustrates a perspective view of one embodiment of a mirror guide 112. The mirror guide 112 has a cylindrical base 502 with an angled surface 504 and a face 506 defining a cut-away portion of the mirror guide 112. In various embodiments, the optical element 508 is formed on the face 506 by depositing or adhering a reflective material to the surface of the face 506. Visible on the top of the mirror guide 112 is a longitudinal opening 312 for receiving a connecting rod or cable, which forces the mirror guide 112 to move by the driving mechanism 132.

Figure 6:
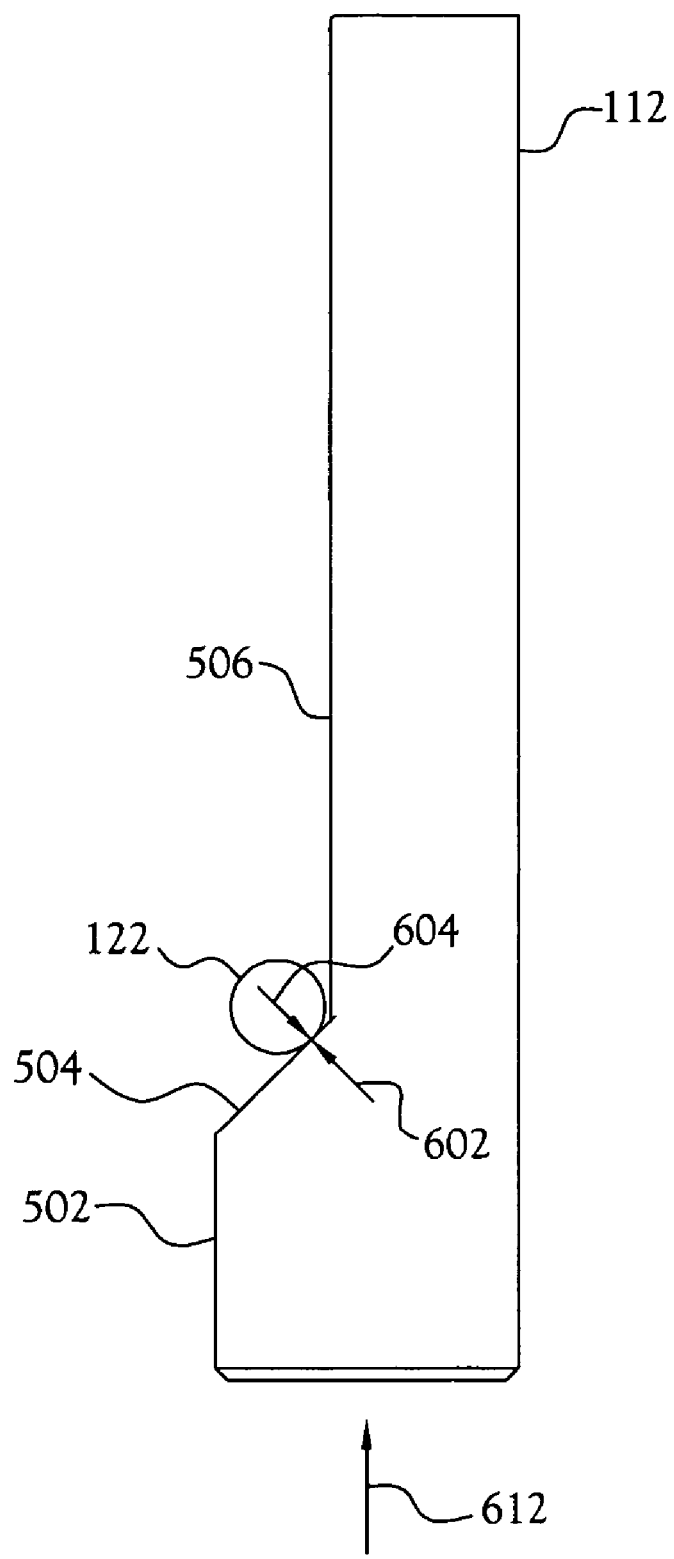
FIG. 6 is a side view of one embodiment of a mirror guide and stop pin.

FIG. 6 illustrates a side view of the mirror guide 112 and stop pin 122. The angled surface 504 contacts the pin 122 when the mirror guide 112 moves along its longitudinal axis 612 to the extended position. The mirror guide 112 has a force vector 602 normal to the angled surface 504 at the point of contact with the pin 122. The pin 122 exerts an opposing force 604 to the force vector 602 applied by the mirror guide 112. In the illustrated embodiment, the pin, or stopper, 122 is cylindrical with the curved surface of the pin 122 contacting the angled surface 504 of the guide 112 along the longitudinal axis of the pin 122. In another embodiment, the pin 122 has a curved surface, but may have a shape that is not entirely cylindrical. In this embodiment, the curved surface of the pin 122 contacts the angled surface 504 of the guide 112.

Figure 7:
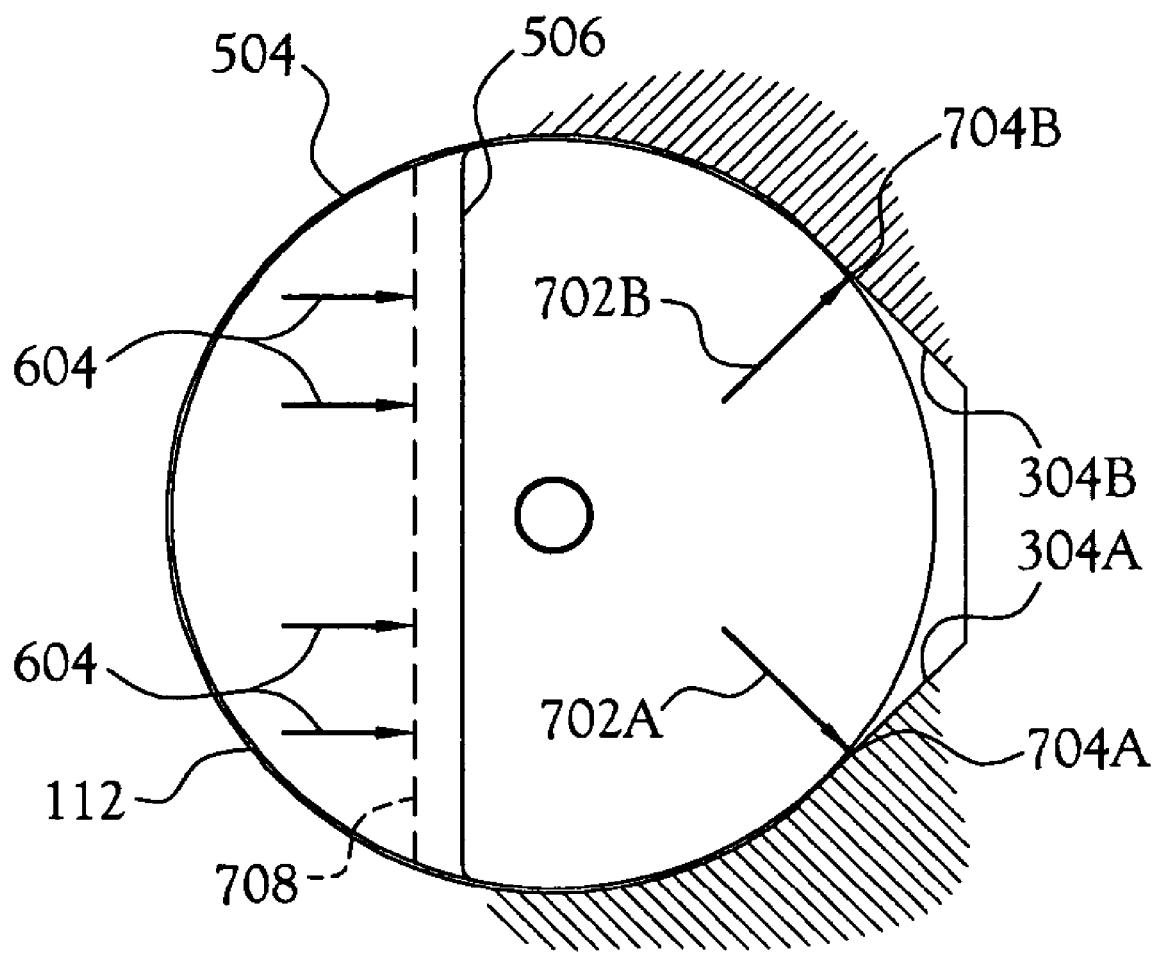
FIG. 7 is a diagrammatic top view of the embodiment of the mirror guide.
Figure 8A:
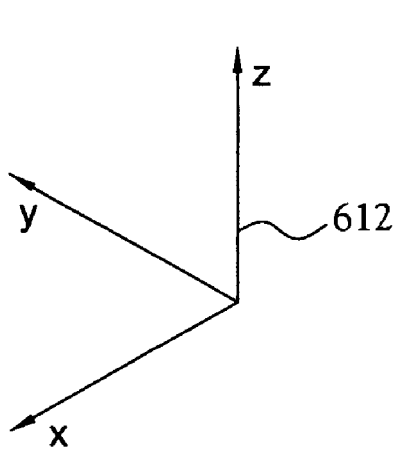
FIGS. 8A, 8B, 8C, and 8D illustrate the axes and rotational angles for the mirror guide.
Figure 8B:
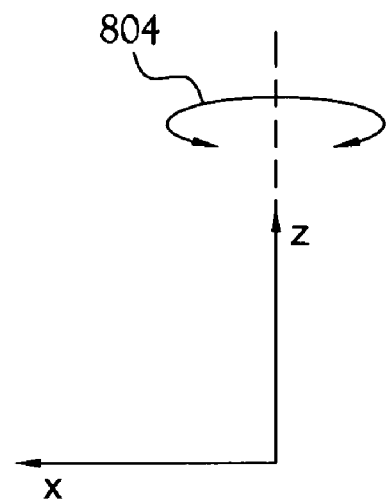
Figure 8C:
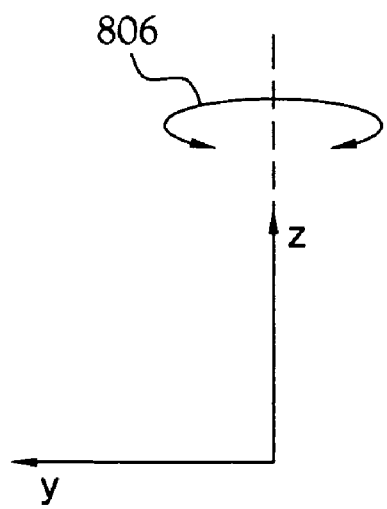
Figure 8D:
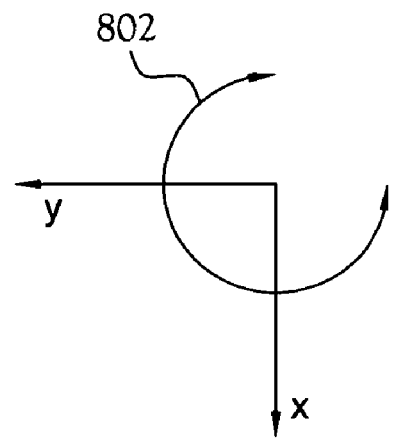

FIG. 7 illustrates a diagrammatic top view of the mirror guide 112. With the mirror guide 112 in the extended position, the mirror guide 112 is forced against the stop pin 122 at a linear contact line 708. The stop pin 122 applies a force 604 to the mirror guide 112 along the linear contact line 708. The stop pin force 604 is transferred to the two force vectors 702A, 702B along the contact lines 704A, 704B. The contact lines 704 are defined by the cylindrical surface of the mirror guide 112 contacting the two sidewalls 304A, 304B.

FIGS. 8A, 8B, 8C, and 8D illustrate the axes and rotational angles for the mirror guide 112. In order to repeatedly position the optical element 508 with high accuracy, the position of the mirror guide 112 in the extended position must be controlled. The position of the mirror guide 112 at the extended position includes the following components: the x, y, and z linear displacement axes and the roll 802, pitch 804, and yaw 806 rotational angles.

The x and y axis are normal to each other and both are normal to the z axis, which is the same as the longitudinal axis 612 of the mirror guide 112. Roll 802 is rotation about the z axis, which is the same as the longitudinal axis 612 of the mirror guide 112. Roll 802 is exhibited by the mirror guide 112 rotating about the longitudinal axis 612 in the channel 212. Pitch 804 is rotation about the y axis and yaw 806 is rotation about the x axis. Pitch 804 and yaw 806 are exhibited by the longitudinal axis 612 of the mirror guide 112 no longer coinciding with the longitudinal axis of the channel 212. With respect to the mirror guide 112, in order to maintain a high level of repeatability, the mirror guide 112, in the extended position, must return to the same x, y, and z linear positions and the same roll 802, pitch 804, and yaw 806 rotational angles.

The stop pin 122, because it is restrained to a fixed position when the mirror guide 112 is in the extended position, directly controls the positioning of the z axis and the roll 802. The force 604 exerted by the roll pin 122 along the pin contact line 708 on the angled surface 504 forces the mirror guide 112 toward the two sidewalls 304A, 304B. The two parallel contact lines 704, where the mirror guide 112 contacts the two sidewalls 304A, 304B, directly control the positioning of the x and y axes, the pitch 804, and the yaw 806. In the extended position, the mirror guide 112 is restrained along three contact lines 704A, 704B, 708 and there is no significant linear displacement along the x, y, and z axes and no significant rotational displacement of roll 802, pitch 804, and yaw 806. The two parallel contact lines 704 define a plane, and the stopper contact line 708 is parallel to that plane.

In the illustrated embodiment, the angled surface 504 is at a 45 degree angle with respect to the longitudinal axis 612. With this angle, the force 604 exerted by the pin 122 has a longitudinal component and a component normal to the longitudinal axis 612. The normal component forces the mirror guide 112 toward the two sidewalls 304A, 304B. By decreasing the angle of the angled surface 504 to the longitudinal axis 612, the magnitude of the normal force increases, as does the tendency for the pin to wedge the mirror guide 112 in the channel 212, thereby requiring a greater force to move the mirror guide 112 to the retracted position from the extended position. By increasing the angle of the angled surface 504 to the longitudinal axis 612, the magnitude of the normal force decreases, thereby reducing the force 704 ensuring the mirror guide 112 contacts the two sidewalls 304 along its full length. In other embodiments, the angled surface 504 is at an angle equal to or less than 45 degrees with respect to the longitudinal axis 612. Angles down to 5 degrees from the longitudinal axis 612 have been found to operate without undue problems. Those skilled in the art will recognize that the angle of the angled surface 504 to the longitudinal axis 612 may vary depending upon the motive force developed by the driving mechanism 132 and the stickiness of the materials used for the pin 122, the mirror guide 112, and the actuator body 102.

It should be noted that two points define a line. Accordingly, to secure the guide 112 in the same manner as the two contact lines 704A, 704B formed by the two flat faces 304A, 304B, in one embodiment four points protrude into the channel 212 and make contact with the guide 112. That is, in this embodiment, the two pairs of points protrude into the channel 212 and the pairs of points define a pair of parallel lines 704.

In various embodiments, the actuator body 102, the stop pin 122, and the guide 112 are constructed from a hard material having a small grain size, for example, ceramic. Ceramic may be polished to higher degree than softer materials such as plastics. When a material is polished, the grain size of the material determines its surface roughness and, thus, its surface area of contact. As a result, when materials come into contact with each other, the area of contact is determined by the grain size of the contacting materials. Materials having a small grain size will have a greater number of grain particles in contact with each other over a given surface area. As such, a smaller grain size results in more contact between the surface of the actuator body 102 and the guide 112.

In one embodiment, for example, the grain size is approximately in the range of 0.3 to 0.5 microns and the distance of travel of shuttle 112 is approximately 2 millimeters. When materials having this grain size come into contact with each other, the contact accuracy may be approximately 0.2 microns. Such a contact accuracy over a distance of approximately 2 mm results in an angular accuracy of approximately 0.0001 radians. The wear of the material results from the dislodging of surface grains, of which the size of the grains is one factor. The more grains that are dislodged, the greater the wear of the material. However, a large force is required to dislodge a grain of any given size. A surface material having a greater number of small gains will tend to have fewer gains dislodged than a material having a fewer number of larger grains. As such, due to the larger number of grain contacts with small grained surfaces, less discernable wear may result than with a material having a larger grain size.

In another embodiment, other fine grained materials that reduce wear on the actuator body 102, the stop pin 122, and the guide 112 are used, for example, zirconia, silicon carbide, silicon nitride, and aluminum oxide. In yet another embodiment, the actuator body 102, the stop pin 122, and the guide 112 are constructed from a metal or plastic material. If a larger grained material, such as a metal, is desired to be used, the speed at which guide 112 is moved is slowed to prevent the generation of forces that may increase the wear on the components. However, the use of ceramics provides greater precision and switching speed than is attainable with larger grained materials. As such, the proper selection of the material for the actuator body 102, the stop pin 122, and the guide 112 aids in achieving a high precision and repeatability in the positioning of optical element 508. Grain size, however, is only one of several factors that may contribute to the wear resistance of a material. Other factors that may contribute to the wear resistance of a material include, for example, coefficients of friction, modulus of rapture, tensile strength, compressive strength, and fracture toughness. The operation of such factors is well known in the art; accordingly, a more detailed discussion is not provided.

In one embodiment, the actuator body 102 is made of a covalently bonded material, such as a ceramic, with a low coefficient of thermal expansion. In one such embodiment the coefficient of thermal expansion is less than or equal to 5 ppm. In one embodiment, the actuator body 102 is made of rebonded fused silica that has the channel 212 formed to have the required shape. In one such embodiment, the actuator body 102 is molded. In another embodiment, the body 102 is machined.

In one embodiment, the mirror guide 112 is formed of drawn quartz that is formed to the required shape. In still another embodiment, both the body 102 and the guide 112 are formed of fused silica, which results in both parts 102, 112 having an equal and very low coefficient of thermal expansion. The fused silica has the advantage of having a very low coefficient of thermal expansion, thereby ensuring that the optical element 508 returns to the same extended position over a wide temperature range, for example −40 degrees to +85 degrees Celsius.

The optical switch actuator 100 is not limited to only having components constructed from the materials described above. In other embodiments, one or more of the actuator body 102, the stop pin 122, and the guide 112 are coated with the materials described above. For example, the actuator body 102, the stop pin 122, and the guide 112 are constructed of any rigid material and coated with a wear resistant ceramic such as titanium nitride or aluminum oxide. The coating is applied using techniques that are well known in the art, for example, chemical vapor deposition.

An advantage, other than wear resistance, to using a ceramic material for the interface between actuator body 102, the stop pin 122, and the guide 112 is that ceramic is not susceptible to cold-metal bonding or welding. Cold-metal bonding occurs when two components in contact are placed under pressure, the more extreme the pressure, the greater the chance of cold-metal bonding occurring. Without cold-metal bonding, less motor power is required to overcome inertia and start the guide 112 moving.

The precise alignment of the guide 112 to the actuator body 102 is critical in fiber optics. Any misalignment can result in an attenuation of the signal or the loss of the signal. By matching the coefficient of thermal expansion of the individual components and adhesives, the components of the optical switch actuator 100 remain in alignment over a wide temperature range such that the optical path does not suffer degradation as the temperature varies. In one embodiment, the temperature range is from −40° to +85° Celsius. In another embodiment, the transition point of the adhesive is outside the operating temperature range, which enhances the dimensional stability of the optical switch actuator 100. In one embodiment, keeping the transition point outside the operating range is accomplished by using fillers. In still another embodiment, the adhesive has limited shrinkage, which can be accomplished with a filler.

In one embodiment, the adhesive securing the stop pin 122 in the notch 210 has a coefficient of thermal expansion similar to that of the actuator body 102 and the stop pin 122 such that the optical element 508 remains in alignment as the temperature varies within the operating range of the optical switch actuator 100. The low thermal expansion of the materials, along with the low friction surfaces and the self-aligning guide 112, results in high repeatability and easier alignment of the optical element 508 within an optical pathway.

The apparatus for aligning the guide 112 includes various functions. The function of aligning the guide 112 in the channel 212 when the guide 112 is in the extended position is implemented, in one embodiment, by the stopper 122 and the two sidewalls 304 in the channel, or through-opening, 212 through which the guide 112 moves. In another embodiment, the function of aligning relies, in addition to the stopper 122, upon the guide 112 contacting the channel 212 at four points.

From the foregoing description, it will be recognized by those skilled in the art that a device for aligning an optical element 508 has been provided. The optical element 508 is attached to a mirror guide 112 that moves between a retracted position and an extended position along a channel, or through-opening, 212 in an actuator body, or member, 102. In one embodiment, the guide 112 is cylindrical and moves within a channel 212 that has a v-shape with the guide 112 forced against the sidewalls 704 of the v-shape by the stopper 122 when the guide 112 is in the extended position.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for aligning an optical element in an optical actuator, said apparatus comprising:
    a driving mechanism for an optical switch actuator;
    a body attached to said driving mechanism, said body including a through-opening and a notch, said through-opening having a first sidewall and a second sidewall, said through-opening having a longitudinal axis;
    a stop pin positioned in said notch of said body, said stop pin being cylindrical, said stop pin fixed in said notch; and
    a guide for carrying the optical element, said guide movable between a retracted position and an extended position, said guide operatively connected to said driving mechanism, said guide having a cylindrical base and an angled surface, said stop pin having a longitudinal axis parallel to a plane defined by said angled surface, said guide having a longitudinal axis parallel to said longitudinal axis of said through-opening, said through-opening slideably receiving said guide, said guide contacting said first sidewall and said second sidewall when said guide is in said extended position, said angled surface of said guide contacting said stop pin when said guide is in said extended position.

2. The apparatus of claim 1 wherein said angled surface forms an angle with said longitudinal axis of said guide, said angle being equal to or less than 45 degrees.

3. The apparatus of claim 1 further including a cap adapted to mate to said body, said cap holding captive said stop pin thereby fixing said stop pin in said notch.

4. The apparatus of claim 1 wherein said stop pin is fixed in said notch with an adhesive.

5. The apparatus of claim 1 wherein said body is formed of a covalently bonded material.

6. The apparatus of claim 1 wherein at least one of said body and said guide is formed of fused silica.

7. The apparatus of claim 1 wherein said body has a coefficient of thermal expansion that is substantially the same as a coefficient of thermal expansion of said guide.

8. An apparatus for aligning an optical element, said apparatus comprising:
    a member having a through-opening;
    a stopper held in fixed relation to said member, said stopper being cylindrical;
    a guide for carrying the optical element, said guide slideably engaging a through-opening between a retracted position and an extended position, said through-opening having a first sidewall and a second sidewall contacting said guide when said guide is in said extended position, said guide contacting said stopper when said guide is in said extended position; and
    a means for aligning said guide in said through-opening when said guide is in said extended position.

9. An apparatus for aligning an optical element, said apparatus comprising:
    a member having a through-opening;
    a stopper held in fixed relation to said member, said stopper being cylindrical;
    a guide for carrying the optical element, said guide slideably engaging a through-opening between a retracted position and an extended position, said through-opening including two flat surfaces; and
    said means for aligning said guide in said through-opening when said guide is in said extended position, said means for aligning including a stopper contacting an angled surface of said guide and forcing said guide against said two flat surfaces in said through-opening.

10. An apparatus for aligning an optical element, said apparatus comprising:
    a member with a through-opening, said through-opening having a first sidewall and a second sidewall, said through-opening having a longitudinal axis;
    a stopper held in fixed relation to said member, said stopper having a curved surface;
    a guide for carrying the optical element, said guide movable between a retracted position and an extended position, said guide having a cylindrical base, said guide having a longitudinal axis parallel to said longitudinal axis of said through-opening, said through-opening slideably receiving said guide, said guide contacting said first sidewall and said second sidewall when said guide is in said extended position, said guide contacting said curved surface of said stopper when said guide is in said extended position; and a driving mechanism secured to said member, said driving mechanism causing said guide to move between said retracted position and said extended position.

11. An apparatus for aligning an optical element, said apparatus comprising:
a member with a through-opening, said through-opening having a first sidewall and a second sidewall, said through-opening having a longitudinal axis;
a stopper held in fixed relation to said member, said stopper having a curved surface; and
a guide for carrying the optical element, said guide movable between a retracted position and an extended position, said guide having a cylindrical base, said guide having a longitudinal axis parallel to said longitudinal axis of said through-opening, said through-opening slideably receiving said guide, said guide contacting said first sidewall and said second sidewall when said guide is in said extended position, said guide contacting said curved surface of said stopper when said guide is in said extended position, said guide including an angled surface engaging said stopper when said guide is in said extended position.

12. The apparatus of claim 11 wherein said angled surface forms an angle with said longitudinal axis of said guide, said angle being equal to or less than 45 degrees.

13. An apparatus for aligning an optical element, said apparatus comprising:
a member with a through-opening, said through-opening having a first sidewall and a second sidewall, said through-opening having a longitudinal axis, said member including a notch;

a stopper held in fixed relation to said member, said stopper having a curved surface, said stopper received by said notch; and a guide for carrying the optical element, said guide movable between a retracted position and an extended position, said guide having a cylindrical base, said guide having a longitudinal axis parallel to said longitudinal axis of said through-opening, said through-opening slideably receiving said guide, said guide contacting said first sidewall and said second sidewall when said guide is in said extended position, said guide contacting said curved surface of said stopper when said guide is in said extended position.

14. The apparatus of claim 13 wherein said stopper is fixed in said notch with an adhesive.

15. An apparatus for aligning an optical element, said apparatus comprising:
a member with a through-opening, said through-opening having a first sidewall and a second sidewall, said through-opening having a longitudinal axis;
a stopper held in fixed relation to said member, said stopper having a curved surface;
a guide for carrying the optical element, said guide movable between a retracted position and an extended position, said guide having a cylindrical base, said guide having a longitudinal axis parallel to said longitudinal axis of said through-opening, said through-opening slideably receiving said guide, said guide contacting said first sidewall and said second sidewall when said guide is in said extended position, said guide contacting said curved surface of said stopper when said guide is in said extended position; and
a cap adapted to mate to said member, said cap holding captive said stopper.

* * * * *